United States Patent [19]
Taylor et al.

[11] Patent Number: 5,110,224
[45] Date of Patent: May 5, 1992

[54] FLEXIBLE CABLE TERMINATION WITH SWIVEL COUPLINGS

[75] Inventors: Kenneth Taylor, Great Dunmow; Roy Allen, London, both of England

[73] Assignee: STC PLC, London, England

[21] Appl. No.: 614,226

[22] Filed: Nov. 15, 1990

[30] Foreign Application Priority Data

Nov. 15, 1989 [GB] United Kingdom ............... 8925819

[51] Int. Cl.⁵ .............................................. G02B 6/36
[52] U.S. Cl. ...................................... 385/25; 385/92; 174/70 S
[58] Field of Search ................. 350/96.2, 96.21, 96.23; 174/70 R, 70 S

[56] References Cited

U.S. PATENT DOCUMENTS

| | | | |
|---|---|---|---|
| 4,703,135 | 10/1987 | Magnani et al. | 174/70 S |
| 4,786,759 | 11/1988 | Gouverneur | 174/70 S |

FOREIGN PATENT DOCUMENTS

| | | |
|---|---|---|
| 634483 | 3/1950 | United Kingdom . |
| 1550588 | 8/1979 | United Kingdom . |
| 2063502 | 6/1981 | United Kingdom . |
| 2122245 | 1/1984 | United Kingdom . |
| 2142788 | 1/1985 | United Kingdom . |
| 2165060 | 4/1986 | United Kingdom . |
| 2176905 | 6/1987 | United Kingdom . |
| 2191872 | 12/1987 | United Kingdom . |

*Primary Examiner*—John D. Lee
*Assistant Examiner*—John Ngo
*Attorney, Agent, or Firm*—Lee, Mann, Smith, McWilliams & Sweeney

[57] ABSTRACT

A flexible termination between a submersible repeater housing and a submarine cable comprises a double ball link bar (20) and a cooperating socket (12) coupled to the repeater housing (1) and a similar socket (11) coupled to the cable. This enables a compact lightweight flexible termination having a large angle of flexure. In an alternative embodiment a double gimbal arrangement is used.

8 Claims, 4 Drawing Sheets

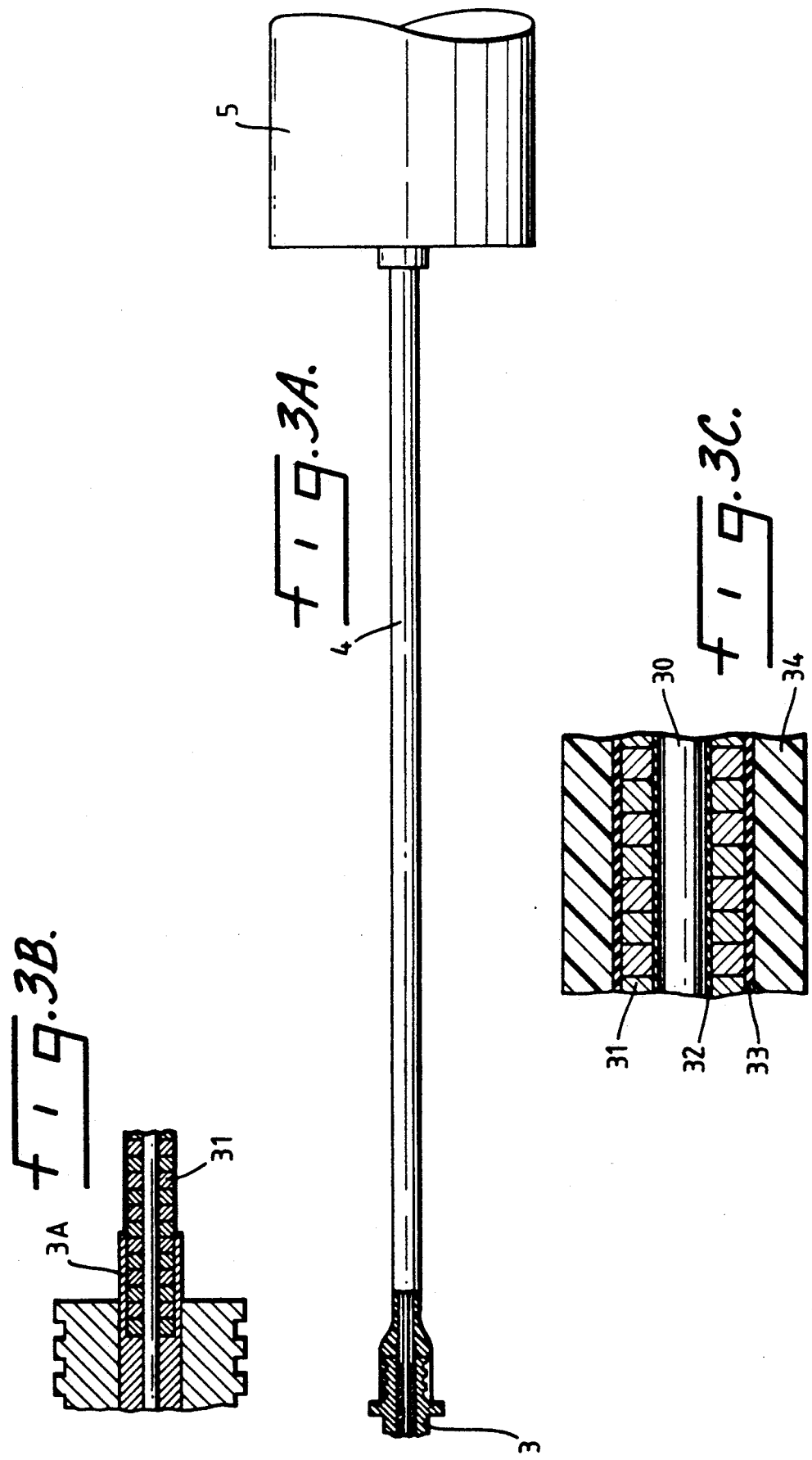

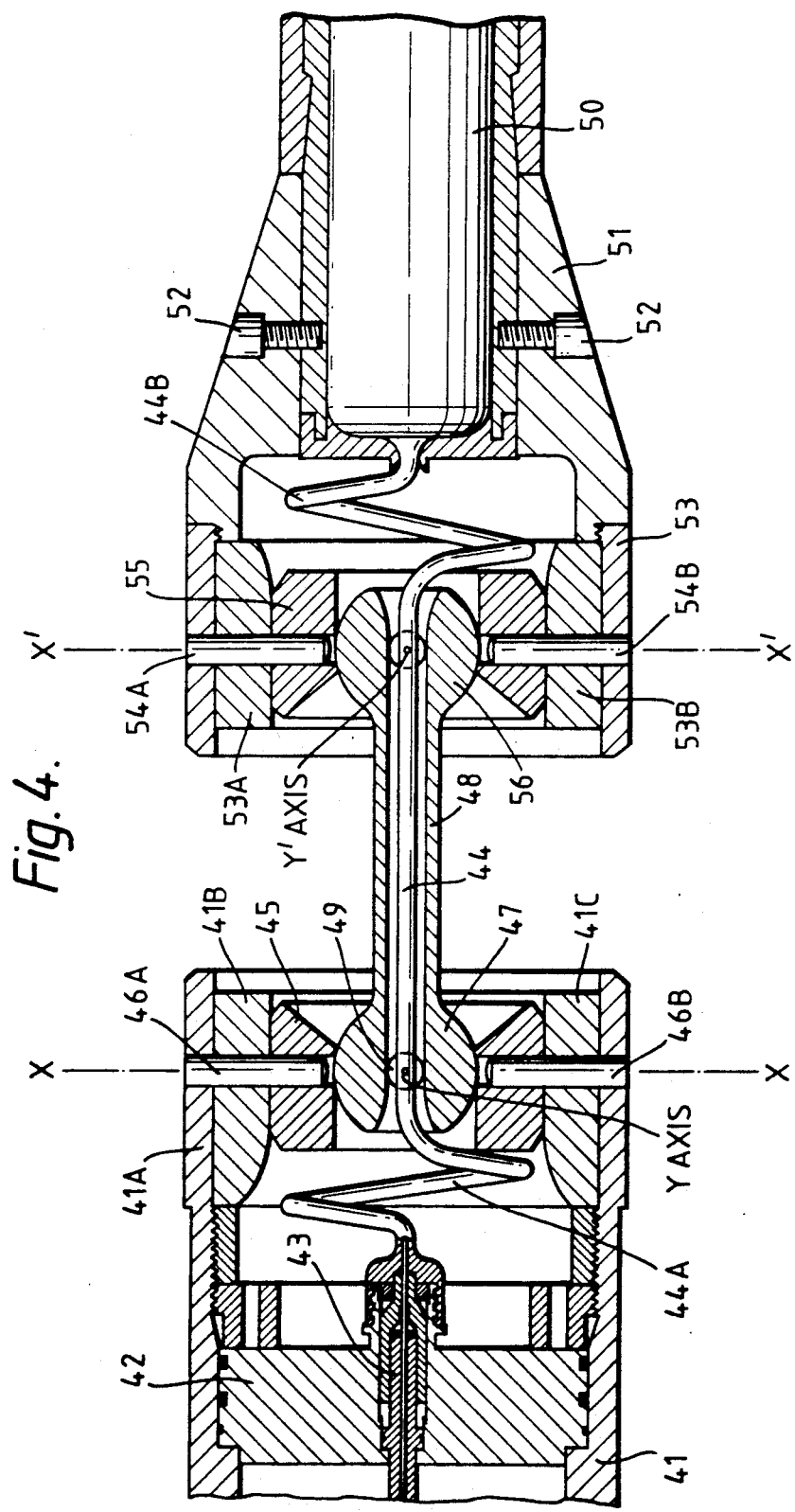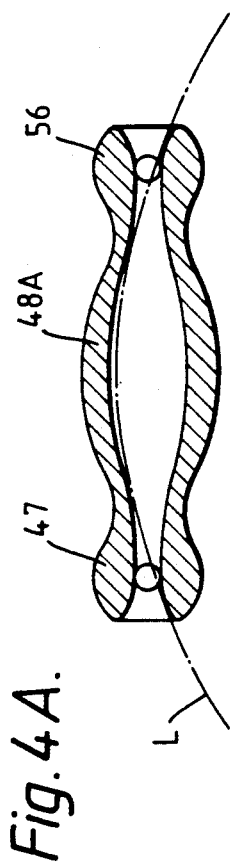

FLEXIBLE CABLE TERMINATION WITH SWIVEL COUPLINGS

BACKGROUND OF THE INVENTION

1) Field of the Invention

This invention relates to a flexible cable termination for terminating a submarine cable to a submerged repeater housing or the like.

2) Discussion of the Prior Art

Underwater long distance modern-day cable systems such as TAT-8 and P-TAT systems utilise a bend limiting device where the cable joins the submerged repeater housing.

Laying and recovery of such a cable imparts high tensile forces in the cable. When a repeater passes around a sheath or winding drum, non equi-axial loading across the cable strength wires may occur due to the severe local bending imposed on the cable at its termination with the repeater. This would inevitably lead to failure of cable components at loads well below the tensile strength of the cable itself.

The purpose of the bend limiter is to equalise these forces by providing a semi-flexible element at each end of the repeater. This device provides a working solution to the problem of bend control at the termination of the cable and the repeater. British patent 2142788 describes this device known as the Armadillo bend limiter. It comprises a segmented structure in the form of a tube made from a number of annular plates, each plate connected to its neighbour with bolts. The structure is tapered externally by providing segments in a range of sizes. A resilient sleeve is provided within the bend limiter to exclude materials which might jam or abraid the bend limiter parts.

In the Armadillo bend limiter, the bolts are of sufficient length to provide a predetermined gap between the adjacent plates. When a straight pull is applied the bend limiter extends to the limit of the bolt restraints. When it is deflected the plates make contact on the inside of the curve whilst they are restrained on the outside by the bolts providing a limited bend. The result of this is that there is a certain amount of play or slackness in both the axial and rotational direction, and this slackness has to be accommodated in the design of the tail tube which links the cable termination to the repeater.

In an ideal situation laying and recovery techniques employed with shipboard installations of for example TAT-8 and P-TAT, require the cable and repeater to pass around the hauling capstan and over the bow and stern sheaths. Whether this is feasible depends to a large extent on the rigid length of the repeater and the physical clearance around the hauling capstan. Similar space constraints are not as severe around the bow and stern sheaths.

An alternative arrangement is known as the Gimbal arrangement and an example is shown in European Patent Application 0268210 and British Patent Application 2197539. This arrangement is satisfactory for short repeater housings e.g. up to 1.5 meters because the angle of deflection is limited to about 58°. For longer housings e.g. about 3 meters the deflection is insufficient.

An alternative solution to the bend-limiter and the gimbal arrangement, although not the first, was proposed about 40 years ago and is shown in British Patent 634483. In this proposal the problem of excessive bend on the cable where it joins the repeater housing is avoided by making the whole repeater housing itself flexible. Here the repeater housing is built up of a plurality of comparatively short tubes, each accommodating a complete unit of the repeater, the tubes being connected to one another by ball and socket joints and which have passages through the joint components to prevent interconnection of the individual repeater units.

This particular form of flexible repeater housing has never we believe been used commercially, owing probably to the expense of manufacture and the difficulty of providing a watertight, gas tight and pressure resistant housing for the amplifier components of the repeater. This aspect is touched upon in line 35, page 3, where it is suggested that the repeater apparatus is itself enclosed in a single continuous sheath of copper. It is not clear however if this is pressure resistant or if the housing is intended to be so, in which case great reliance would need to be placed on the seals alluded to in line 24 on page 3.

Flexible repeater housings were however used commercially many years ago for analogue systems where they were built into the cable structure by wire reinforcing elements laid over the repeater element.

Here the repeater elements are pressure-resistant, and are surrounded by polythene, which provides the water resistance in turn surrounded by armour wires providing the required tensile strength across the repeater. Such an arrangement has not been used for many years and certainly not extended to optical submarine systems.

It is an object of the present invention to provide a flexible cable termination providing flexure over a large angle in excess of 58° in a simple and cost effective manner, and enabling the problem of slack associated with previous bend-limiter proposals to be minimised if not eliminated.

SUMMARY OF THE INVENTION

According to the present invention there is provided a flexible cable termination for connecting a submarine cable to a rigid repeater housing comprises first and second swivel couplings, the first coupling having housing connection means for connection to the repeater housing, the second coupling having cable connection means for connection to the cable, the couplings being joined by a rigid hollow link bar which can accommodate flexible transmission elements extending between the cable and the repeater housing and which is smaller in diameter than either coupling so that the termination can bend through an angle of more than 58°, there being means to prevent rotation of the cable connection means relative to the housing connection means.

In the embodiment the link bar carries the respective balls of first and second ball and socket arrangements forming the respective couplings. Conveniently each socket has an inwardly protruding pin which locates in an axially aligned groove on the surface of the cooperating ball whereby to prevent rotation of the sockets relative to each other.

In another embodiment each coupling is formed as a gimbal arrangement.

According to another aspect of the present invention there is provided a flexible tail cable for optically and electrically connecting a submarine cable to a repeater housing via a flexible termination, the cable comprising a flexible hydrostatic-pressure-resistant tube to prevent hydrostatic sea-bed pressures damaging the optical fibres, means to limit the bend radius of the cable, and an insulating sheath to insulate an electrical conductor of the cable from the sea water.

BRIEF DESCRIPTION OF THE DRAWINGS

In order that the invention can be more clearly understood reference will now be made to the accompanying drawings in which FIGS. 3A-3C show a tail tube cable connecting the sea cable with the repeater via the termination, and FIG. 4 shows an alternative termination according to a second embodiment of the invention, FIG. 4A showing a modification to FIG. 4.

DESCRIPTION OF THE PREFERRED EMBODIMENTS

Figure 1:
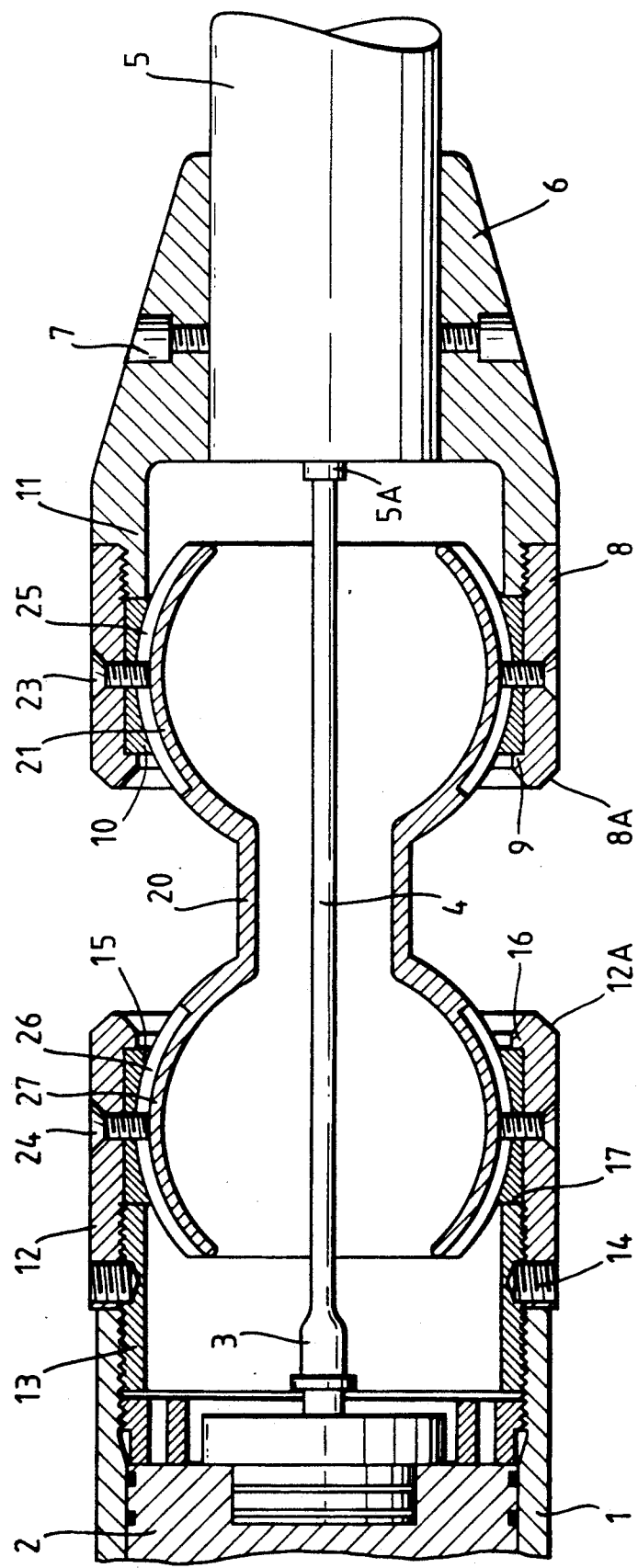
FIG. 1 shows a ball and socket flexible termination according to an embodiment of the invention.

Referring to FIG. 1 of the drawings a repeater casing 1 has a main bulkhead 2 providing a high pressure seal between the sea water and the inert atmosphere inside the repeater housing.

Through the bulkhead 2 is a cable gland 3 through which a tail cable 4 is sealed into the bulkhead 2. The tail cable 4 incorporates both electrical and optical conductors, the electrical conductor for providing power for the repeater, the optical conductors transmitting the communication signals.

Figure 2:
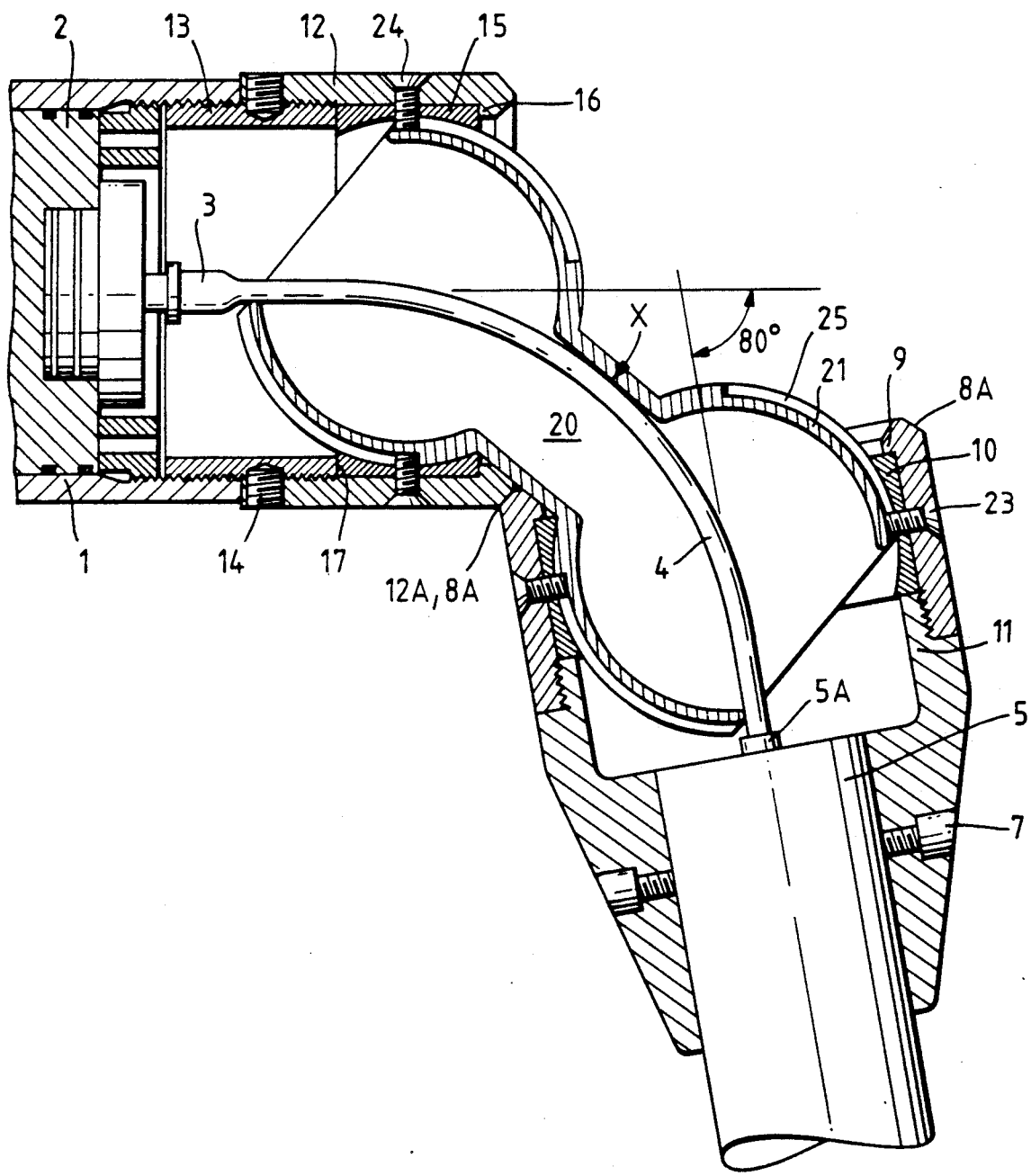
FIG. 2 shows the arrangement of FIG. 1 in its fully deflected or bent position.

The tail cable 4 is a straight flexible cable which can be bent through an arc as shown in FIG. 2 of the drawings.

The main sea cable 5 which may be made according to our earlier patents 1550588, 2063502, 2165060, 2176905 or 2191872, is not described in detail here.

The cable is anchored by an anchorage device such as that described in our British patent No. 2122245. This anchorage arrangement would be bolted to a tail 6 via the bolt holes 7.

The main sea cable 5 is joined to the tail cable 4 at a rigid joint 5A, and an example of a suitable tail cable and method of manufacture, is shown in FIG. 3

The tail 6 is screwed into a cylindrical housing 8 having a radially inwardly projecting rim 9 retaining an insert 10 which is split along a plane containing the longitudinal axis.

The insert 10 is retained in the housing 8 between the rim 9 and a shoulder 11 on the tail 6.

The housing 8 and insert 10 form one socket of the double ball and socket arrangement.

The repeater casing 1 has a socket similar to the one described, comprising a housing 12 similar to the housing 8 but adapted to be secured to a ring 13 screwed into the end of the repeater casing 1. These are locked together by means of bolts 14.

The housing 12 similarly has a split insert 15 which is held in the housing 12 between an inwardly radially directed rim 16 on the housing 12 and the nose 17 of the ring 13.

The two housings and their component parts form sockets defining part spherical inner surfaces defined by the inserts 10 and 15.

These inserts ride on outer spherical surfaces of a double ball link bar 20 having a first ball 21 which fits in the right-hand socket as viewed in FIG. 1 and a second ball 22 which fits in the left-hand socket of FIG. 1.

In order to prevent the right and left-hand sockets rotating relative to each other, each socket has diametrically opposed pins 23 in the right-hand socket and 24 in the left-hand socket, which locate in part-circumferential slots 25 and 26 in the balls 21 and 22, respectively. This ensures that any cable torque is transmitted to the repeater casing 1.

The link bar is hollow throughout its length and in this particular embodiment at its narrowest point in the centre has a diameter of about 100 mm, the length between centres of the balls 21 and 22 is approximately 260 mm and the arrangement can withstand a tensile load of 9 tons. Other applications may require different dimensions and strength.

Referring to FIG. 2 the ball and socket arrangement of FIG. 1 is shown in its fully deflected position. As can be seen each housing 8 and 12 has an angled cylindrical nose 8a and 12a respectively which butt up against each other in the fully deflected position. This acts as a stop limiter and provides an overall deflection angle in this embodiment of 80°.

It can also be seen that the tail cable flexes through the 80° angle in a smooth curve throughout its length, just embracing the inside of the link bar around its central position indicated at X in FIG. 2.

The advantage of the ball and socket limiter described is that there is little if any slack in the assembly so that when tensile load is put on the cable such as during laying or recovery operations, there is little if any relative movement between the parts of the arrangement, thereby avoiding undue tensile stresses being applied to the flexible tail cable. The arrangement is also particularly compact and lightweight in comparison with the Armadillo arrangement described earlier, and will deflect over a greater angle than the Gimbal arrangement of the other prior art referred to earlier.

This enables a simpler tail cable to be provided than that previously used, such as the coiled tail cable shown in GB 2197539. A simpler cable suitable as the tail cable is shown in FIG. 3. The optical package 30 similar to the ones described in our aforementioned patent and in fact the package of the cable 5 could extend through the tail cable, is housed in a springy spirally wound strength member 31 having an inner 32 and an outer 33 high voltage insulation sheath secured thereto. A polyethylene outer sheath 34 is extruded over 33 and completes the cable.

The strength member 31 is like a strong closed coil spring and is made preferably of rectangular-cross-section metal which has good elastic properties. The ends of the tail cable are fixed, at one end in the cable gland 3 and at the other end to the cable 5 at joint 5A, at least the gland and possibly also the joint 5A having been previously moulded onto the tail cable before assembly into the termination. As shown in FIG. 3, the closed coil strength member 30 fits into and is brazed to a sleeve 3A within the gland 3.

Referring now to FIG. 4, the termination is similar to that depicted in FIGS. 1 and 2, except that the ball and socket joints have each been replaced by a gimbal coupling.

In the drawings a repeater casing 41 has a main bulkhead 42 which provides a high pressure seal between the seawater and the inert atmosphere inside the repeater casing 41. A tail cable 44 extends through a cable gland 43 in the bulkhead 42.

The seacase 41 has an extension portion 41A having inside opposed bearing surfaces 41B and 41C. These cooperate with a swivel bearing 45 which is carried by a pair of swivel pins 46A and 46B enabling swivelling of the bearing 45 about the axis X—X.

In turn the bearing 45 carries a second swivel bearing 47 formed as a ball-like end on a hollow connecting link bar 48. A second pair of swivel pins 49 locked in the bearing 45 and carrying the ball 47 enable the ball 47 to swivel in the bearing 45 about the Y-axis.

The bearing surfaces would be provided by a preferably metallic material having suitable strength and corrosion resistant properties.

So far has been described the coupling which is secured to the repeater housing.

The second part of the coupling secured to the cable end is shown on the right-hand side. The cable 50, similar in all respects to the cable 5 of FIG. 1, is anchored by an anchorage device similar to that described in our British Patent 2122245. This arrangement is bolted to a tail 51 via bolt hole 52.

The tail 51 is screwed into a cylindrical housing 53 carrying inside a pair of opposed swivel bearing surfaces 53A and 53B. A pair of gimbal swivel pins 54A and 54B serve the same function as swivel pins 46A and 46B, in that an inner swivel bearing 55 is carried by the swivel pins and can swivel about the axis X'—X'.

The inner swivel bearing 55 carries inside it a swivel ball joint 56 rigidly fixed on the other end of the link bar 48. Ball joint 56 is carried in the swivel bearing 55 by a second pair of swivel pins so that ball joint 56 can swivel about the Y' axis.

The termination described thus comprises a double gimbal using swivel pins to provide the same angle of bend (approx 80°) as the double ball and socket joint described with reference to FIGS. 1 and 2.

One of the differences between the embodiment of FIG. 4 and the embodiment of FIGS. 1 and 2, is that the tail cable 44 in the embodiment of FIG. 4 is a conventional tail cable in so far that it has a coiled end 44A where it is joined through the gland 43 and another coiled end 44B where it is joined to the main sea cable 50.

However it is envisaged that a straight tail cable such as the one shown in FIG. 3 could be utilised in the embodiment of FIG. 4 provided the link bar 48 is bulged in the middle sufficient to enable a continuous smooth arc to be achieved when the termination is fully bent, as shown in FIG. 2, but not so large as to interfere with the mating edges of the parts 53 and 41A or the extremities of the bearing surfaces 41B, 53A, 45 and 55 so that the large angle of flexing of the termination is not interfered with. Thus the link bar could be bulged in the middle to an extent similar to that of portion 20 in FIG. 1. In this case the portion 20 would then taper back to the sides of the link bar shown in FIG. 4 and then expand into the ball joints 47 and 56. A rough sketch of such a link bar is shown in FIG. 4A. The broken line L indicates the arc path which would be adopted by the tail cable with such a link bar, and with this embodiment a tail cable similar to the one described in FIG. 3 could be used.

In all embodiments described the angle of flexibility of the termination is in excess of 58° and in both embodiments extends to 80°. This enables a long repeater housing i.e. up to 10 ft in length to be connected at both ends to a sea cable and passed around a bow sheave or capstan handling arrangement where the sharp angle between the cable and the repeater casing is accommodated in the termination.

What is claimed is:

1. A flexible cable termination for connecting a submarine cable to a rigid repeater housing comprises first and second swivel couplings, the first coupling having housing connection means for connection to the repeater housing, the second coupling having cable connection means for connection to the cable, the couplings being joined by a rigid hollow link bar which can accommodate flexible transmission elements extending between the cable and the repeater housing and which is smaller in diameter than either coupling so that the termination can bend through an angle of more than 58°, there being means to prevent rotation of the cable connection means relative to the housing connection means.

2. A termination as claimed in claim 1, wherein each coupling comprises a ball and socket, and the hollow link bar has the ball of each coupling fixed at the ends of the bar.

3. A termination as claimed in claim 2, wherein each ball has a groove in its surface in which is located a pin fixed to the associated socket, constituting the means to prevent relative rotation.

4. A termination as claimed in claim 2, wherein each socket has a cylindrical nose wherein the noses abut one another to limit the deflection of the termination in its fully deflected position.

5. A termination as claimed in claim 1, each coupling comprising a gimbal with swivel pins on axes at 90°.

6. The assembly of the submarine cable connected to the submersible repeater housing by the termination as claimed in claim 1, said housing being coupled to said housing connection means, said cable being coupled to said cable connection means, and transmission elements for optical and power transmission extending through the link bar between the cable and the repeater.

7. The assembly as claimed in claim 6, comprising a straight flexible tail cable incorporating said transmission elements and which, in the fully deflected position of the termination, bends resiliently through a gentle smooth arc.

8. The assembly as claimed in claim 7, wherein the tail cable comprises a tube of helically wound resilient metal having inner and outer tubes of high voltage insulation material.

* * * * *